(12) United States Patent
Siqueira

(10) Patent No.: US 6,804,350 B1
(45) Date of Patent: Oct. 12, 2004

(54) METHOD AND APPARATUS FOR IMPROVING ECHO CANCELLATION IN NON-VOIP SYSTEMS

(75) Inventor: Marcio Siqueira, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 442 days.

(21) Appl. No.: 09/745,382

(22) Filed: Dec. 21, 2000

(51) Int. Cl.[7] .............................................. H04M 9/08
(52) U.S. Cl. ........................... 379/406.01; 379/406.02; 379/406.06; 379/406.08; 379/406.09; 379/406.11; 379/406.14
(58) Field of Search .................... 379/406.01–406.16

(56) References Cited

U.S. PATENT DOCUMENTS

| | | | |
|---|---|---|---|
| 5,651,091 A | * | 7/1997 | Chen .......................... 395/2.32 |
| 5,912,966 A | * | 6/1999 | Ho .......................... 379/406.01 |
| 6,209,013 B1 | * | 3/2001 | Gonikberg et al. .......... 708/319 |
| 6,434,233 B1 | * | 8/2002 | Bjarnason et al. ...... 379/406.01 |

* cited by examiner

*Primary Examiner*—Forester W. Isen
*Assistant Examiner*—Ramnandan Singh (57) ABSTRACT

A method and system for improving performance of an echo canceller with low additional complexity. Specifically, the present invention discloses using information from internal variables of Code Excited Linear Prediction (CELP) based codecs in a digital communication network to significantly improve the rate of convergence of the echo canceller. In one embodiment of the present invention, an error signal associated with a voice signal is filtered by a transversal filter using Linear Predictive Coefficients (LPC) coefficients to provide filter transfer functions for a Filtered-X Least Mean Squares algorithm. Additionally, an adaptive filter applies the Filtered-X Least Mean Squares algorithm using the pre-filtered voice signal available in a CELP-based decoder to create a synthetic echo signal which is subtracted from the echo signal for attenuation.

36 Claims, 7 Drawing Sheets

Eigen values for different vowels with prefiltering (dashed lines) and without prefiltering (solid lines).

FIG. 4

Simulations with 100 taps and an arbitrary impulse response.
The used echo-to-noise was 60 dB.

FIG. 5

Simulations with 100 taps and an arbitrary impulse response.
The used echo-to-noise was 60 dB.

METHOD AND APPARATUS FOR IMPROVING ECHO CANCELLATION IN NON-VOIP SYSTEMS

BACKGROUND OF THE INVENTION

1. Field of the Invention

The present invention relates to the field of echo cancellers. Echo cancellers simulate the hybrid response that is reflected back to a caller in order to cancel the reflected echo signal.

2. Related Art

Communication networks such as the Internet using Voice-over Internet Protocol, digital wireless or cellular networks, and packet switched networks are only a few of the many digital communication networks currently available to the public. Increased competition within these markets focuses technology towards achieving better quality of service, specifically in the area of echo cancellation.

Digital communication networks are affected by echo signals that are reflected back to a caller generating a voice signal. These reflected echoes can reduce the quality of service to unacceptable levels. A primary source of echo signals comes from the hybrid response from a hybrid circuit. This hybrid circuit is necessary to convert signals that are transmitted through a 4-wire public switched telephone network (hereinafter referred to as "PSTN") to 2-wire local connections to end users. For best performance, a 4-wire connection throughout a network from the PSTN to the end user would eliminate the hybrid response. However, since most end users such as homes and businesses are wired with 2-wire local connections from the local exchange in order to reduce costs, this hybrid response must still be addressed.

As a voice signal from a first end user passes through the hybrid circuit, energy from the voice signal is leaked back to the first end user in the form of a hybrid response. This hybrid output is the echo signal. Thus, a voice signal will be reflected back in the form of an echo on top of a voice signal from a second end user. This echo significantly degrades voice quality of the signal received by the first end user.

Some form of echo cancellation is needed in order to attenuate the echo signal produced through the hybrid circuit. Where there are significant delays between end users, as discussed previously, the higher the attenuation of the echo signal is needed. Echo cancellers subtract an algorithmically generated synthetic echo signal from the incoming voice signal in order to reduce or eliminate echo. Currently, echo cancellers present in different types of systems using VoIP technology usually employ plain or normalized Least-Mean- Squares (hereinafter referred to as "LMS") algorithms for estimating a replica of the echo and properly subtracting it.

Figure 1:
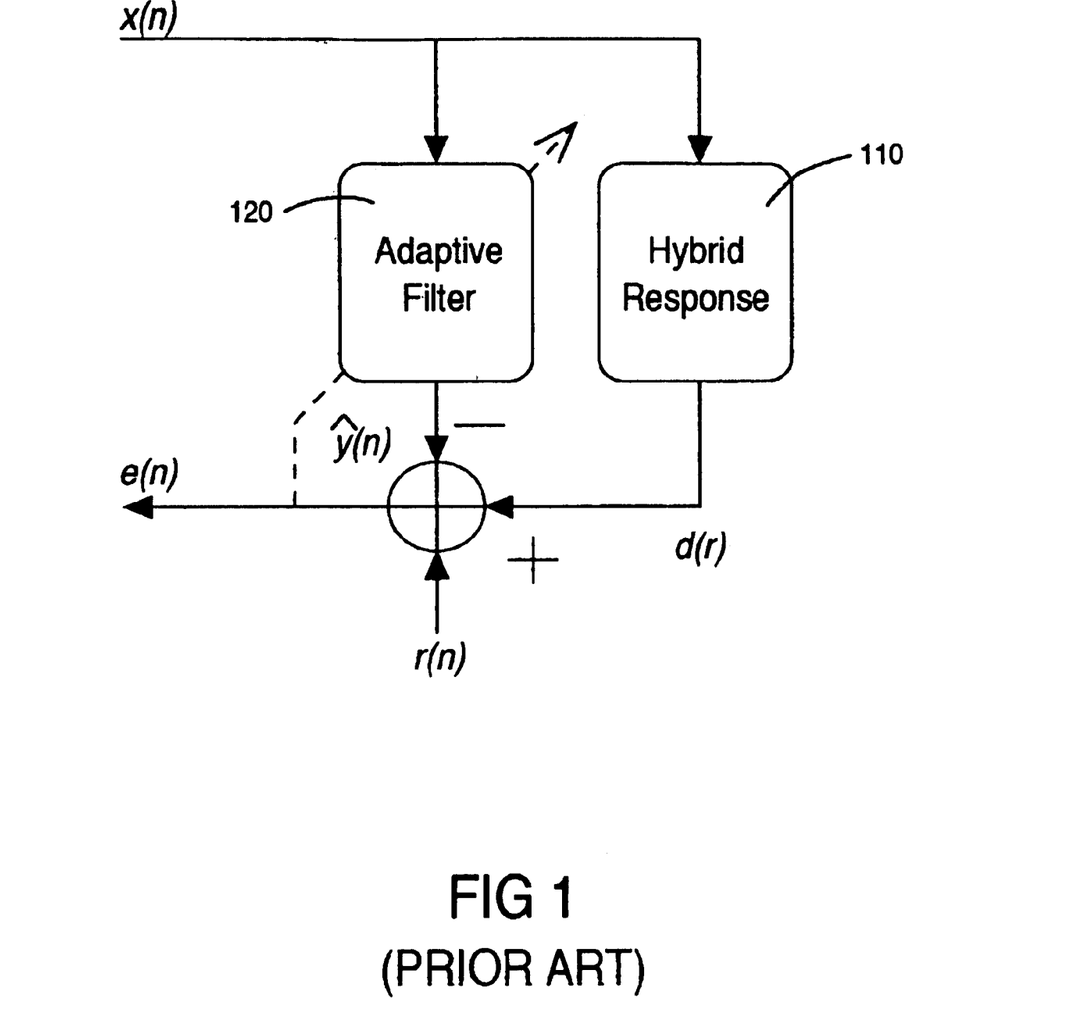
FIG. 1 illustrates a block diagram of the echo cancellation problem with hybrid feedback.

FIG. 1 illustrates a generalized echo canceller in the prior art that uses the LMS algorithm (plain or normalized LMS algorithms) to come up with the synthetic echo, or the canceling signal. The input x(n) represents the input to the adaptive filter and is typically speech. This speech input is the same input into the hybrid circuit that produces the hybrid response 110. The adaptive filter 120 essentially tries to model the hybrid response 110. This is done by applying the LMS algorithm to the input signal x(n) to estimate the reflected echo signal. This estimated or synthetic signal is subtracted from the hybrid response to reduce its degrading effects.

However, the convergence of the LMS algorithm is dependent on the input signal's spectral characteristics. The LMS and normalized LMS algorithms are very sensitive to correlated signals such as voice, having a faster convergence rate for uncorrelated signals such as white noise (flat spectrum), and a slower convergence rate for non-white signals or correlated signals. Unfortunately, since voice signals are correlated, echo cancellers using plain or normalized LMS algorithms have slow convergence rates for estimating the echo signal. Thus, there is a need to improve the performance of echo cancellers in digital communication networks.

Variations of the LMS algorithm such as LMS-lattice and LMS-Newton can be used for improving convergence but they have significantly higher computational complexity at higher additional cost. This fact has prevented the use of these alternatives to the conventional LMS algorithm in commercial systems. Thus, there is a need for a cost-effective way of improving the performance of echo cancellers.

Voice-over Internet Protocol Networks are poised to enter the commercial market. VoIP Gateways act as a bridge between the local PSTN and the digital network. The VoIP gateway converts analog voice signals from a first end user into digitized data packets for transmission over a communication network such as the internet to a second end user. VoIP technology reassembles the packets and reconstructs the analog signal at the second end user. The cost can be dramatically reduced for long distance telephone charges such as those in the international long distance market.

However, massive delays between the routers through the Internet communication network require significant levels of echo cancellation. The present echo cancellers that use LMS or normalized LMS algorithms are incapable of significantly reducing the hybrid response within a short period of time. As a result, the quality of service for VoIP calls is reduced. Thus, it would be advantageous to improve the quality of service in VoIP telecommunications.

SUMMARY OF THE INVENTION

It is an object of the present invention to improve the performance of echo cancellers in digital communication networks. It is another object of the present invention to improve the quality of service in digital communication networks such as VoIP telecommunications.

Specifically, the present invention discloses a method and system for improving performance of an echo canceller with one additional filtering operation. By using information from internal variables of Code Excited Linear Prediction (CELP) based codecs in a Voice-over Internet Protocol, the rate of convergence of an echo canceller is significantly improved with minimal additional complexity.

In one embodiment of the present invention, an error signal associated with a voice signal transmitted over a digital communication network, such as the Voice-over Internet Protocol network, is filtered by a transversal filter using Linear Predictive Coefficients (LPC) coefficients associated with the voice signal. The LPC parameters provide the filtering parameters or filter transfer functions for a Filtered-X Least Mean Squares algorithm. Additionally, an adaptive filter uses the Filtered-X Least Mean Squares algorithm and the pre-filtered input to create a synthetic echo signal. This synthetic echo signal is subtracted from the echo signal to attenuate the resulting echo level.

These and other objects and advantages of the present invention will no doubt become obvious to those of ordinary

BRIEF DESCRIPTION OF THE DRAWINGS

PRIOR ART.

DETAILED DESCRIPTION OF THE INVENTION

Reference will now be made in detail to the preferred embodiments of the present invention, a joint speech decoding and adaptive filtering technique for improving echo cancellation, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

NOTATION AND NOMNCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, it is an object of the present invention to improve the performance of echo cancellers in digital communication networks. It is another object of the present invention to improve the quality of service in digital communication networks such as VoIP telecommunications.

By improving the convergence rate of echo cancellation subsystems in VoIP systems, it is expected to achieve a significant improvement in the quality of full-duplex calls. This improvement is achieved by slightly modifying the Least Mean Square Algorithm (LMS), adding one transversal filter to filter the error signal, and taking the input to the adaptive filter in the echo canceller from Code Excited Liner Prediction codecs to apply a Filtered-X LMS algorithm in order to improve the rate of convergence for an echo canceller.

LMS ECHO CANCELLERS

FIG. 1 shows that an echo canceller in a VoIP system tries to estimate a hybrid impulse response in order to obtain an instantaneous replica of the echo signal. In FIG. 1, $x(n)$ represents the input to the adaptive filter and is typically speech; a version $y(n)$ in the same figure, is sent back to the original speaker. The function $d(n)$ represents the desired signal to the adaptive filter; here it is assumed to be $y(n)$ added to noise $r(n)$. In the case of echo cancellation, $d(n)$ is the hybrid output. In the optimal case, the taps of the adaptive filter $w^i(n)$, $i=0, \ldots, N$ should be exactly equal to the hybrid impulse response $h^i$, $i=0, \ldots, N$ and, thus, the error signal should only contain the noise samples $r(n)$.

The relationship between the eigenvalue spread of the input signal correlation matrix and the convergence of the Least Mean Square (hereinafter referred to as "LMS") algorithm in an echo cancellation scenario is discussed in the next section. The following sections will show how the Filtered LMS algorithm can be used for mapping the eigenvalues of the input signal into another set of eigenvalues that lead to increased convergence of the LMS algorithm in the presence of speech. Also, it will be shown that the additional variables necessary for the eigenvalue mapping can be obtained from Linear Predictive Coding (hereinafter referred to as "LPC") coefficients. Based on the aforementioned, an efficient joint echo cancellation and speech coding scheme for VoIP is suggested. Simulations and discussions of obtained results follow.

CONVERGENCE AND EIGENVALUE SPREAD

The recursions for the LMS algorithm are shown below:

$$e(n) = d(n) - w^T(n)x(n) \tag{1}$$

$$w(n+1) = w(n) = \mu x(n)e(n) \tag{2}$$

In the above equations, x(n) represents the input signal, d(n) represents the desired signal, w(n) is the instantaneous tap estimation, e(n) is the error signal and $\mu$ is the LMS convergence factor. The vector x(n) is defined as $$x(n) = [x(n)x(n-1) \ldots x(n-N)]^T \tag{3}$$

where N is the order of the adaptive filter.

In the optimal case, w(n)=h (see FIG. 1); this implies that the error signal e(n) is equal to r(n).

It can be shown that the mean square error converges to a steady-state value according to the following relation:

$$\xi(n) = E\{e^2(n)\} \tag{4}$$
$$= \xi_{min} + [w(n) - w_{opt}]^T R[w(n) - w_{opt}]$$
$$\xi_{min} = E\{y^2(n)\} - p^T R^{-1} p$$
where $w_{opt} = R^{-1}p$,
$R = E\{x(n)x^T(n)\}$, $p = E\{x(n)d(n)\}$ and
$y(n) = w^T(n)x(n)$.

By taking the expected value of (2), and assuming that w(n) and x(n) are independent, it is possible to show that $$E\{(w(n) - w_{opt})\} = (I - \mu R)^n (w_0 - w_{opt}) \tag{6}$$

where $w_0$ is the initial condition of the taps vector. By assuming that $\mu \to 0$ so that w(n) varies slowly compared to the input signal x(n), we can substitute the above equation into (4). The result is shown below in Equation (7).

$$\xi(n) = \xi_{min} + w^T_{opt} R(I - \mu R)^{2n} w_{opt} \tag{7}$$

It was assumed that $w_0$=0. It is important to note that this equation implies that $\xi(n) \to \xi_{min}$ with $n \to \infty$ and $\mu < 1/\sigma_x^2$, where $\sigma_x^2$ is the variance of the input signal x(n). this implies that the misadjustment is zero, which is expected when $\mu \to 0$.

By expressing the input signal correlation matrix using the orthogonal representation $$R = \Phi \Lambda \Phi^T \tag{8}$$

where $$\Phi = [\Phi_0 | \Phi_1 | \ldots | \Phi_N] \tag{9}$$

is an orthonormal matrix composed of orthogonal vectors $\Phi_i, i=0, \ldots, N$, and $$\Lambda = \text{diag}[\lambda_0, \lambda_1 \ldots, \lambda_N] \tag{10}$$

it is possible to rewrite (7) as follows:

$$\xi(n) = \xi_{min} + \sum_{i=0}^{N} |\Phi_i^T w_{opt}|^2 \lambda_i (1 - \mu \lambda_i)^{2n} \tag{11}$$

Several assumptions were made to simplify the above relation. In particular, it was assumed that the input signal autocorrelation matrix can be approximated as a circulant matrix for high order N, causing its eigenvectors to be approximately equal to the DFT basis. Also, it was assumed that a hybrid circuit impulse response can be approximated as a single impulse in the region where most of the energy is present. These approximations lead to the following relation in Equation 12.

$$\xi(n) = \xi_{min} + \frac{1}{N+1} \sum_{i=0}^{N} \lambda_i (1 - \mu \lambda_i)^{2n} \tag{12}$$

This equation shows that the slowest convergence mode is $(1-\mu\lambda_{min})^2$. On the other hand, the upper limit for $\mu$ is $1/\lambda_{max}$. This implies that a large eigenvalue spread is undesirable and tends to limit the convergence rate.

FILTERED-LMS ALGORITHMS APPLIED TO ECHO CANCELLATION

This section will investigate the improvement in convergence of the LMS echo canceller by filtering some of its internal variables. Different versions of Filtered-LMS algorithms exist. An example of Filtered-LMS algorithm is the Filtered-X LMS (hereinafter referred to as "FxLMS") algorithm. The FxLMS algorithm uses filtered versions of the input signal and the error signal for estimating the instantaneous tap vector w(n). The algorithm is shown in Table 1.

In the equations in Table 1, the following definitions were used:

$$X_f(n) = F[x(n)]$$

$$d_f(n) = F[d(n)]$$

$$e_f(n) = F[e(n)]$$

where F[.] denotes a linear filtering operation, that can be performed by an FIR or IIR digital filter.

Equation (16) uses a filtered version of the error signal, $e_f(n)$ for the computation of the taps recursion. The variable $e_f(n)$ can be computed as shown in the equation below.

$$e_f(n) = F[d(n) - w^T(n)x(n)] \tag{13}$$

In the case that w(n) changes slowly in time (for example, due to the use of a small $\mu$), the above relationship can be approximated as follows in Equation (14).

$$e_f(n) \approx e_p(n) = F[d(n)] - w^T(n)F[x(n)] \tag{14}$$
$$= d_f(n) - w^T(n)x_f(n)$$

Figure 2:
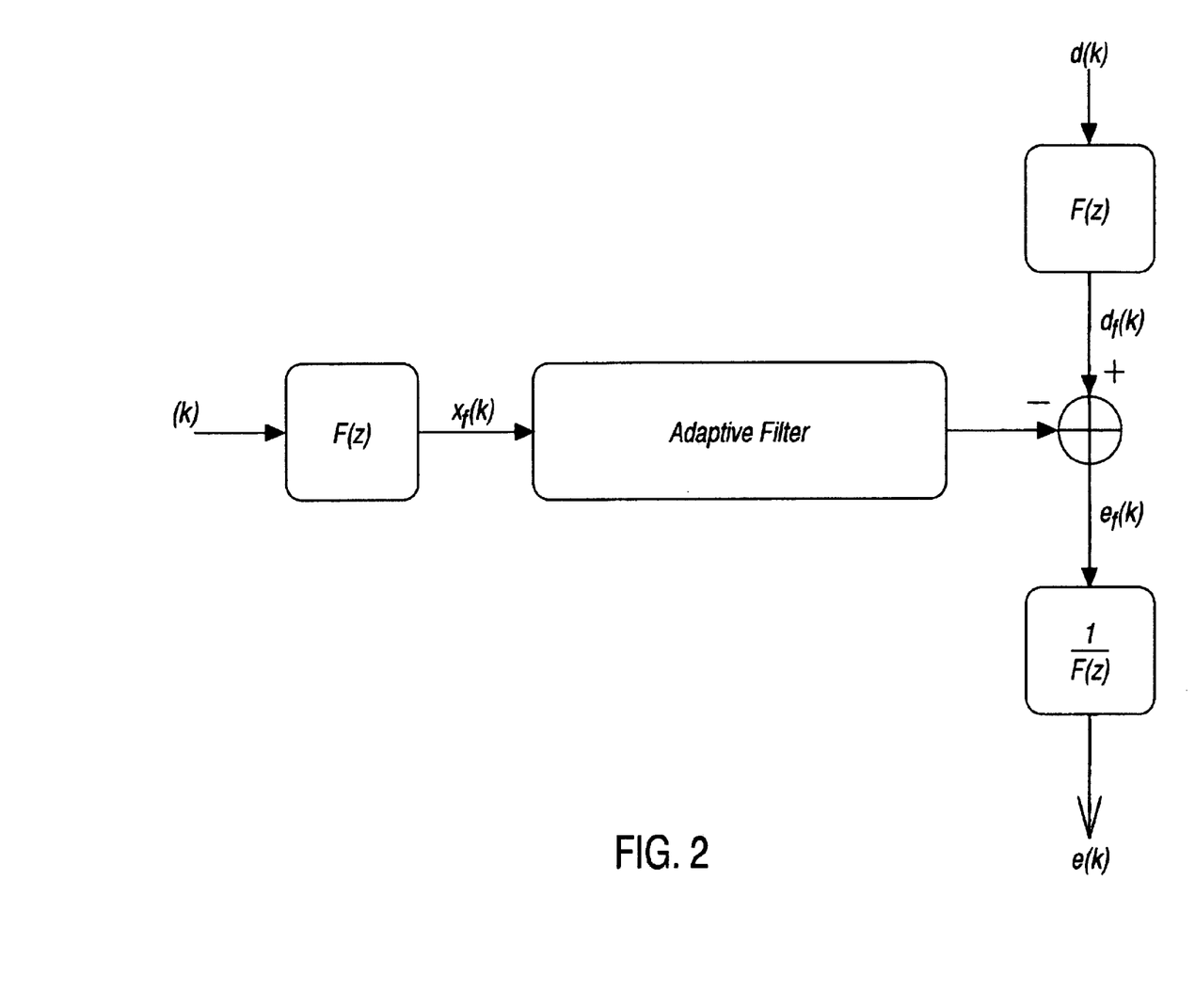
FIG. 2 illustrates a block diagram of an echo canceller that implements the LMS algorithm with pre-filtered inputs in accordance with one embodiment of the present invention.

Equation (14) assumes that the adaptive filter can be approximated as a linear time-invariant system for small $\mu$. The use of (14) for computing the filtered error signal $e_p(n)$ generates an algorithm shown in Table 2 and FIG. 2. We will refer to this algorithm as the LMS algorithm with pre-filtered inputs. In this table, $F^{-1}[.]$ denotes an inverse filtering operation with respect to F[.]. The set of equations displayed in Table 2 can be interpreted as an approximation to the FxLMS algorithm for the case when $\mu \to 0$, and should provide insight into the behavior of the FxLMS for this case.

TABLE 1

FxLMS algorithm $$e(n) = d(n) - w^T(n)x(n) \tag{15}$$

$$w(n + 1) = w(n) + \mu x_f(n)e_f(n) \tag{16}$$

TABLE 2

LMS algorithm with pre-filtered inputs $$e_p(n) = d_f(n) - w^T(n)x_f(n) \tag{17}$$

$$w(n + 1) = w(n) + \mu x_f(n)e_p(n) \tag{18}$$

$$e(n) = F^{-1}[e_p(n)] \tag{19}$$

The convergence of the LMS algorithm with pre-filtered inputs is a function of the characteristics of the filtered input signal that is fed to the transversal tap delay line. It is expected, thus, that the convergence should be a function of the eigenvalues of the filtered input signal correlation matrix.

It is possible to derive the following approximation for the convergence of the mean square error for the LMS algorithm with pre-filtered inputs in Equation 20.

$$\xi(n) \approx \xi_{\min} + \frac{1}{N+1}\sum_{i=0}^{N}\lambda_i^f\left(1-\mu\lambda_i^f\right)^{2n} \tag{20}$$

where $\lambda_i^f, i=0, \ldots, N$ are the eigenvalues of filtered input signal correlation matrix.

It is clear that it is possible to change the convergence of the taps of the LMS algorithm by properly filtering some of its internal variables. It is also-clear that it is necessary to determine a filter $F(z)$ so that the set of eigenvalues $\lambda_i$ are mapped into the set of eigenvalues $\lambda_i^f$ that achieve a faster convergence rate.

ALL-POLE SPEECH MODEL APPLIED TO THE FILTERED-LMS ALGORITHMS

Reducing the eigenvalue spread is an attempt to whiten the signal's spectrum. In the extreme case of white noise, all the eigenvalues of the input signal correlation matrix are the same and equal to the input signal power. The problem is thus reduced to finding $F(z)$ that is able to reduce the eigenvalue spread. This can be accomplished by using assumptions about the input signal characteristics, here assumed to be speech.

It is widely known that voiced vowels can be modeled as the output of an all-pole system excited by a periodic waveform. The periodic waveform models the glottal function, and its period determines the pitch of the input signal. The all pole transfer function models the vocal-tract resonances. The same model is valid for voiceless sounds, where the excitation is replaced by white noise that is shaped by an approximately all-pole transfer function. Thus, a voiced sound can be modeled as follows in Equation 21.

$$x(n)=g(n)*t(n) \tag{21}$$

Equation 21 shows that a voiced signal $x(n)$ can be modeled as the convolution of a voiced source $g(n)$ and the vocal tract impulse response $t(n)$. As mentioned before $t(n)$ is the impulse response of an all-pole transfer function that models the vocal tract and its frequency response can be written as follows in Equation 22.

$$T(z) = Z\{t(n)\} = \frac{G}{1 - \sum_{i=1}^{P} a_i z^{-i}} = \frac{G}{A(z)} \tag{22}$$

It is also known that, given a speech segment, it is possible to estimate $T(z)$ by using linear prediction coding techniques. It is, thus, possible to obtain an estimate of $g(n)$, the glottal excitation signal, as follows in Equation 23.

$$g(n) = Z^{-1}\left\{\frac{A(z)}{G}X(z)\right\} \tag{23}$$

The variable function $X(z)$ is the Z-transform of the speech segment $x(n)$. That is, by filtering a speech segment $x(n)$ with a filter of transfer function $F(z)=A(z)/G$, it is possible to obtain $g(n)$. The resulting signal will not contain peaks associated with the vocal tract transfer function, and its spectrum will be flattened. It should also be expected that, by filtering $x(n)$ with $F(z)=A(z)/G$, the eigenvalue spread of the correlation matrix will be reduced.

Figure 3:
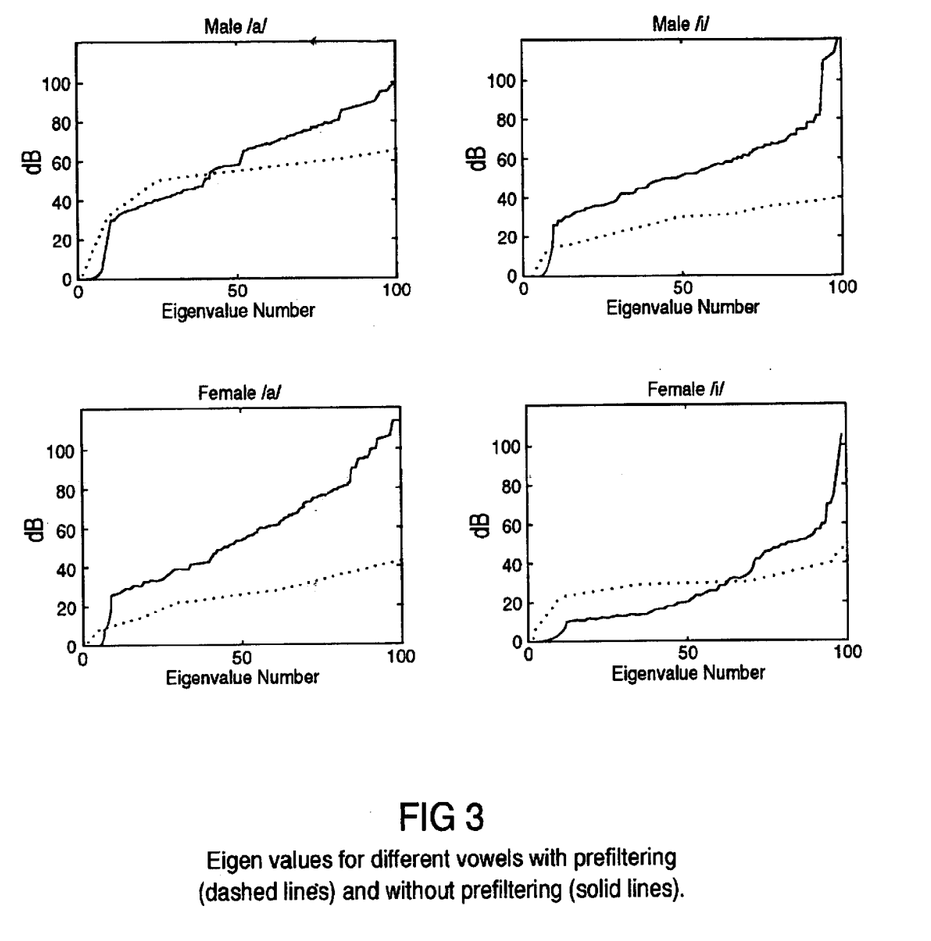
FIG. 3 illustrates a graph diagram showing eigenvalues for different vowels with pre-filtering and without pre-filtering in accordance with one embodiment of the present invention.

Computer simulations show that, by filtering vowels with $F(z)=A(z)/G$ computed from the LPC coefficients, the eigenvalue spread is indeed reduced. In the simulations, /a/ and /i/ vowels recorded from male and female speakers were used. FIG. 3 shows the eigenvalue spread $\lambda_i/\lambda_{min}$ of the input signal correlation matrix in dB, with an order N=100 with and without pre-filtering the inputs with $F(z)$. It can be seen that, by filtering the signal $x(n)$ with $F(z)$, the eigenvalue spread $\lambda_{max}/\lambda_{min}$ of the signal correlation matrix can be reduced by 40 to 80 dB, leading to an improved convergence rate. This will be shown by simulations in the next section.

SIMULATIONS

A block version of the Normalized LMS (hereinafter referred to as "NLMS") algorithm was used in the Filtered-LMS implementation. The sampling rate was 8 KHz and the block sizes were set to 128 samples (16 ms), so that the signal in each block can be assumed to be stationary when speech is the input to the adaptive filter. The Levinson-Durbin recursion was used to estimate $F(z)$, the FIR filter used to filter $x(n)$ and $e(n)$ in the weights recursion of the block NLMS algorithm. The LPC order was 18. For comparison, a block implementation of the conventional NLMS algorithm was also used.

In the simulations, an arbitrary impulse response was used. The simulations used ERLE (Echo Return-Loss Enhancement) and Misalignment to compare the adaptive filters' convergence performance.

Figure 4:
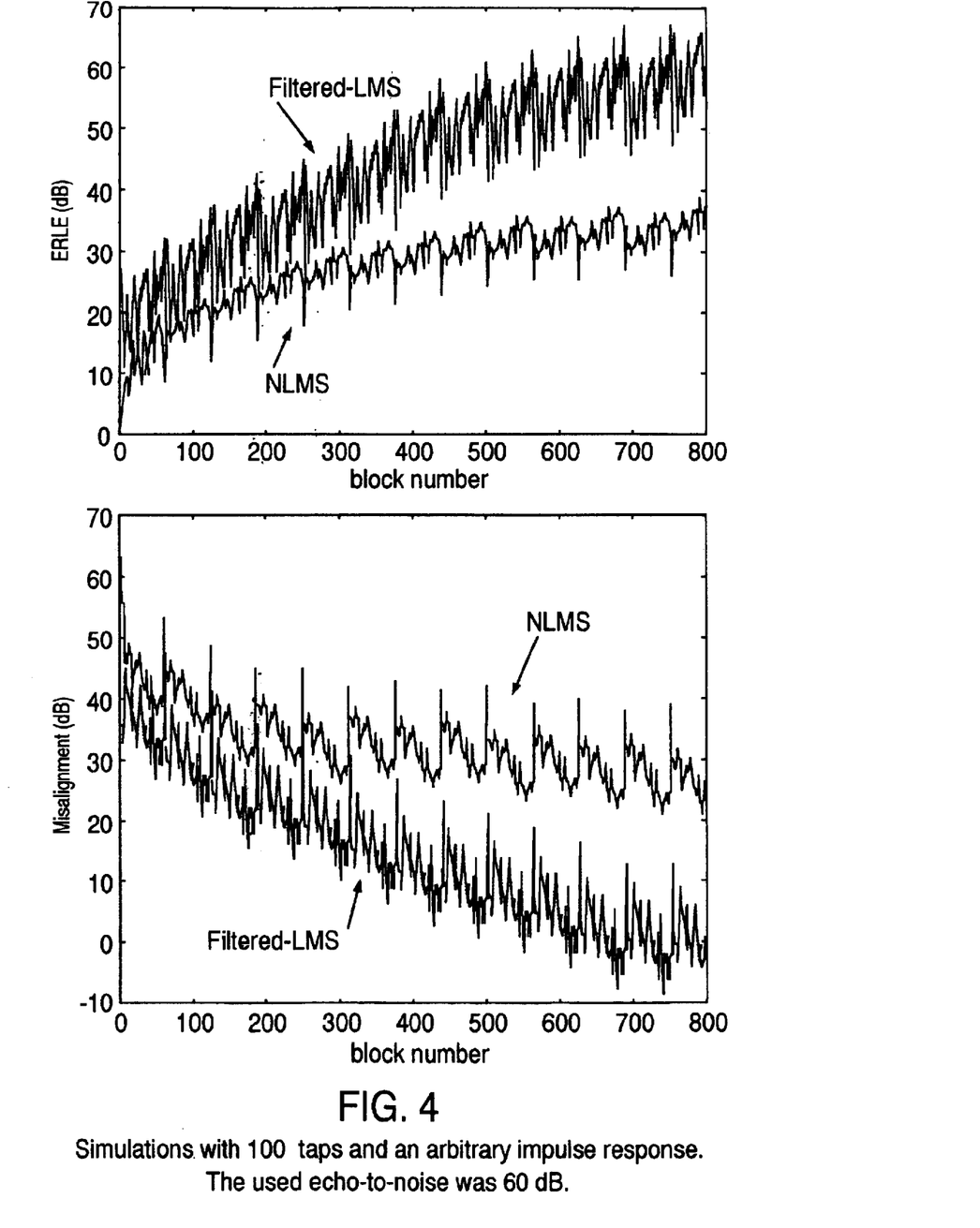
FIG. 4 illustrates a graph diagram showing a reduction of the eigenvalue spread where the echo to noise ratio is 60 dB in accordance with one embodiment of the present invention.
Figure 5:
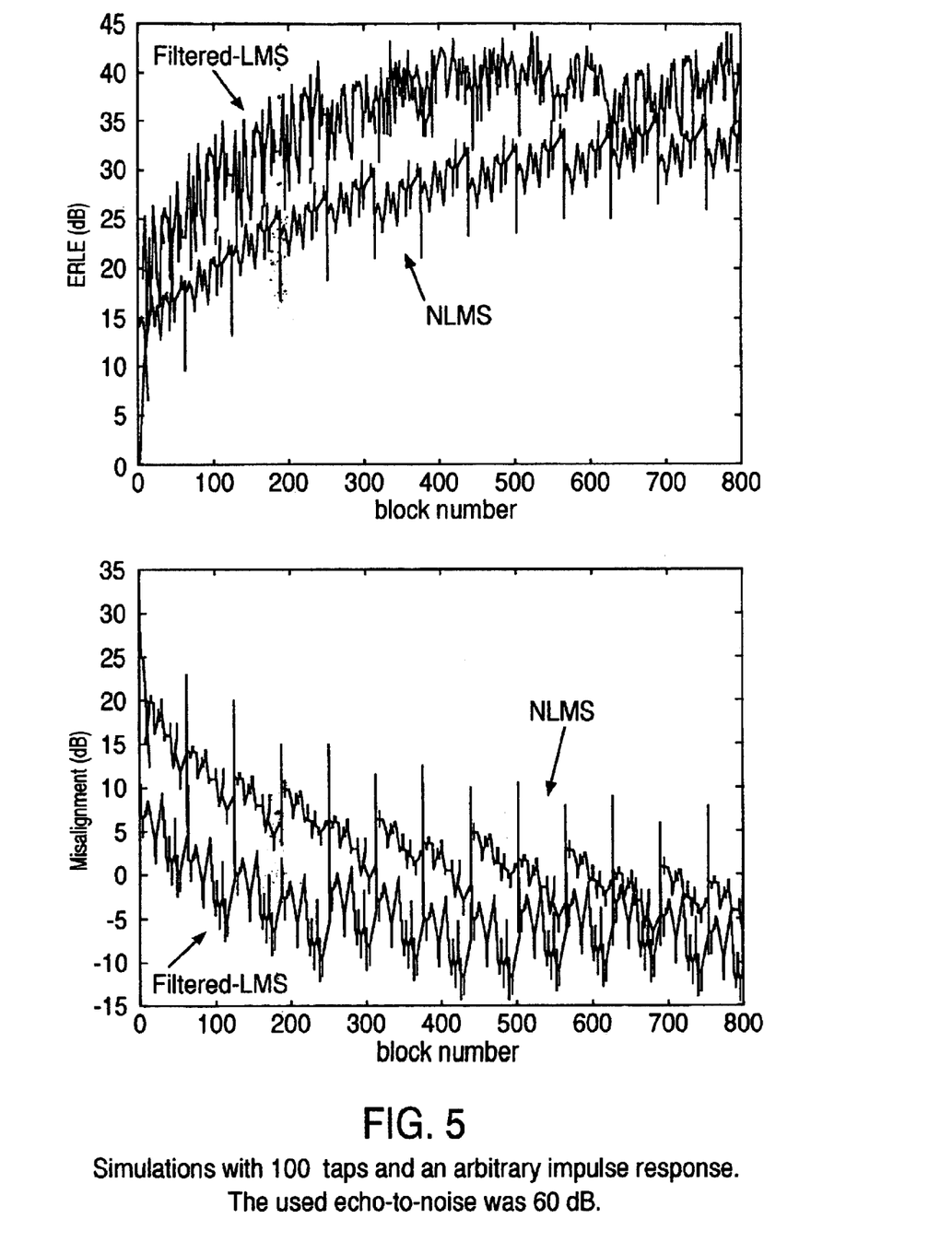
FIG. 5 illustrates a graph diagram showing a reduction of the eigenvalue spread where the echo to noise ratio is 30 dB in accordance with one embodiment of the present invention.

The first set of simulations used a hybrid impulse response with 100 samples and an adaptive filter with 100 taps. Simulations with signal-to-echo ratios equal to 60 dB and 30 dB were run. The used input was a human vowel (male /a/) that lasted 16s. The normalized convergence factor was set to $\mu'=0.05$ for both algorithms. These simulations are shown in FIGS. 4 and 5. It can be seen that the Filtered-LMS offers significant improvement over the NLMS algorithm. The Filtered-LMS exhibits faster rates of convergence and may give a higher attenuation of the echo signal that is the hybrid response from a hybrid circuit.

JOINT SPEECH DECODING AND ADAPTIVE FILTERING FOR IMPROVING AN ECHO CANCELLER'S RATE OF CONVERGENCE

This work showed that it is possible to map the eigenvalues from the input signal correlation matrix, when the input signal is assumed to be speech, into another set of eigenvalues that have a smaller spread. This mapping can be performed by using a filter that is the inverse of the LPC transfer function of the input signal when it can be assumed to be all-pole. The resulting adaptive algorithms, known as Filtered Least Mean Square algorithms (FxLMS algorithm in Table 1, and LMS algorithm with pre-filtered inputs in Table 2), have faster convergence, requiring additional transversal filtering operations and the estimation of the LPC parameters. This faster convergence can be immediately applied towards improving the quality of service over digital communication networks.

Due to the need of LPC parameters, Filtered-LMS algorithms can be considered complex for some applications, but in the case that an acoustic echo canceller and an LPC-based decoder are jointly designed, it is possible to improve the echo canceller performance by only two additional filtering operations.

Furthermore, by using the FxLMS algorithm, it is possible to obtain the same performance, but with only one additional transversal filtering operation. Thus, one embodiment of the present invention provides for improved echo cancellation performance with low additional complexity. Since the LPC parameters and variable coefficients needed for the FxLMS algorithm are obtained from the CELP or LPC-based codecs and the transverse or transversal filter, the improved echo cancellation performance is obtained without significant computational complexity. Also, the addition of only one transverse or transversal filter to achieve higher performance provides for an economical improvement in echo cancellation.

Figure 6:
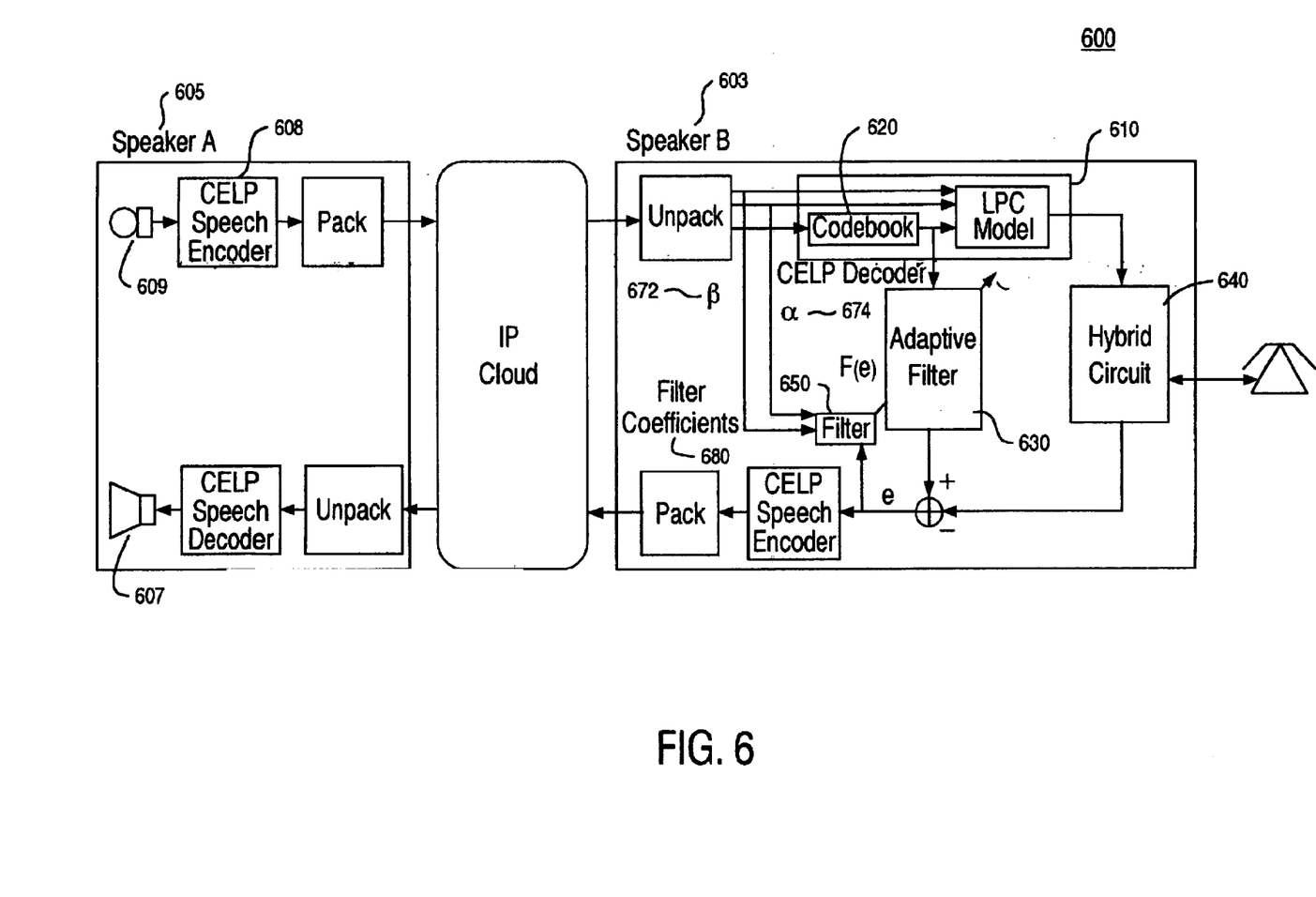
FIG. 6 illustrates a joint echo cancellation and speech coding echo canceller in accordance with one embodiment of the present invention.

FIG. 6 illustrates one embodiment of the present invention that is capable of implementing the FxLMS algorithms with only one additional filtering operation. The communication system 600 in FIG. 6 represent s Voice-Over-Internet-Protocol connection. Speaker A 605, represented on the left side, uses arbitrary equipment not relevant to this discussion. Speaker B 603 uses a system that is interfaced with conventional 2-wire telephone sets. The 2-wire interface is usually implemented by the use of a hybrid circuit, represented in Speaker B's 603 system. Hybrid circuits have the disadvantage of generating echoes - the signal that is decoded by Speaker B's 603 decoder is reflected back through the transmission path to Speaker A, convolved with the hybrid circuit impulse response.

In one embodiment of the present invention, an echo canceller depicted in Speaker B's 603 system of FIG. 6 is capable of implementing the FxLMS algorithm with only one additional filtering operation by using variables and signals form the CELP based speech decoder 610. The FxLMS algorithm can be implemented by using the output from the codebook 620 as the input $x_f(n)$ to the adaptive filter 630. The output from the codebook 620 is the signal that most closely resembles the segment of speech filtered with the inverse LPC transfer functions from the long-term (beta) 672 and short-term (alpha) 674. This results in a pre-filtered voice signal. The filtered error signal used by the FxLMS can be obtained by properly filtering the original error signal from the adaptive filter 630 with the inverse transfer function of the LPC model obtained from the short term (alpha) 674 and long-term (beta) 672 predictors in the transversal filter 650.

Additionally, the codebook present in the CELP based decoder 620 is used to obtain the pre-filtered voice signal with reduced eigenvalue spread. The pre-filtered voice signal is obtained from the codebook 620 output which is closest to the voiced signal segment filtered by the inverse LPC transfer functions in the encoder, such as encoder 608.

Figure 7:
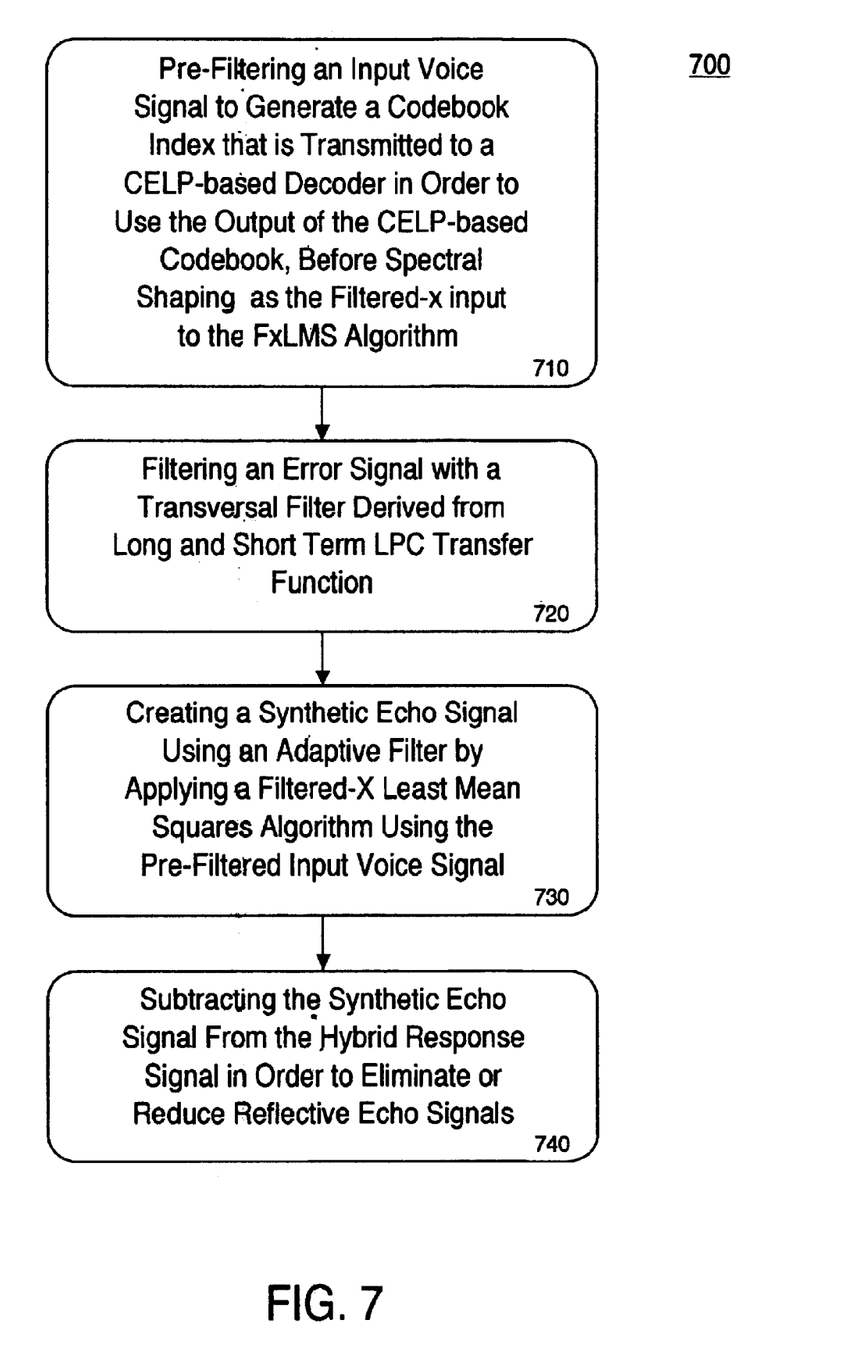
FIG. 7 is a flow diagram illustrating steps in an echo canceller to reduce the deleterious effects of a returned echo signal in accordance with one embodiment of the present invention.

FIG. 7 in conjunction with FIG. 6 illustrates an exemplary flow diagram for a process 700 that improves the rate 171 of convergence for an echo canceller, in accordance with one embodiment of the present invention. In step 710, the input to the FxLMS adaptive filter, $x_f(n)$, is derived directly form the output of the codebook 620, which is part of a Code Excited Linear Prediction (CELP) based decoder.

In step 720 of process 700, the original error signal that includes the hybrid response and other noise signals is filtered using a transversal filter 650. The original error signal is filtered using filter coefficients 680 that are based upon the LPC model parameters, the long-term (beta) 672 and short-term (alpha) 674.

In step 730 of process 700, a synthetic echo signal is created using the Filtered-X Least Mean Square Algorithm (FxLMS) on the pre-filtered input voice signal. The filtered variables, $x_f(n)$ (the pre-filtered voice input signal) and $e_f(n)$ (the filtered error signal), of the FxLMS algorithm were used to calculate the taps in the FxLMS adaptive filter. The FxLMS algorithm is applied at the adaptive filter 630.

In step 740, the synthetic echo signal that is the output from adaptive filter 630 is subtracted from the hybrid output signal d(n) in order to reduce the amount of echo signal returning to the end user at speaker 607.

The preferred embodiment of the present invention, a method and system for joint speech decoding and adaptive filtering in order to improve an echo canceller's rate of convergence is thus described. While the present invention has been described in particular embodiments, it should be appreciated that the present invention should not be construed as limited by such embodiments, but rather construed according to the below claims.

What is claimed is:

1. A method of cancelling an echo signal resulting from a voice signal from a first transmitter/receiver, said voice signal transmitted over a communication network to a second transmitter/receiver, comprising:

obtaining a pre-filtered voice signal with reduced eigenvalue spread from a speech decoder for use as an input to an adaptive filter;

filtering an error signal with a transversal filter to produce a filtered error signal using filter coefficients associated with said voice signal, said error signal including said echo signal;

using said adaptive filter with said filtered error signal and said pre-filtered voice signal to generate a synthetic echo signal; and subtracting said synthetic echo signal from said echo signal to cancel said echo signal.

2. The method as described in claim 1, wherein a linear prediction coding (LPC) technique generates said pre-filtered voice signal using LPC coefficients associated with said voice signal.

3. The method as described in claim 1, wherein said pre-filtered voice signal is an output from a codebook that is part of a Code Excited Linear Prediction (CELP) based decoder, the input into said codebook being an index sent by an encoder.

4. The method as described in claim 1, wherein said filter coefficients employ Linear Prediction Coding (LPC) coefficients, said LPC coefficients based on the long term (beta) and short term (alpha) predictors associated with said voice signal and taken from CELP-based codecs associated with said first and second transmitter/receivers.

5. The method as described in claim 1, wherein said synthetic echo signal is created using a Filtered-X Least Mean Square (FxLMS) algorithm.

6. The method as described in claim 1, wherein said echo signal is a hybrid circuit output associated with said voice signal.

7. The method as described in claim 1, wherein said filtered error signal is generated by filtering said error signal with the inverse transfer functions of an LPC model obtained from long-term (beta) and short-term (alpha) predictors associated with said voice signal.

8. The method as described in claim 1, wherein said voice signal is modeled as an output of an all-pole system excited by a periodic waveform, said output inversely filtered to whiten said voice signal resulting in said step of pre-filtering said voice signal.

9. A method of cancelling an echo signal resulting from a voice signal from a first transmitter/receiver, said voice signal transmitted over a communication network to a second transmitter/receiver, comprising:
   obtaining a pre-filtered voice signal with reduced eigenvalue spread from a speech decoder for use as an input to an adaptive filter;
   filtering an error signal with a transversal filter to generate a filtered error signal using filter coefficients based on said LPC coefficients;
   applying a Filtered-X Least Mean Square (FxLMS) algorithm using said pre-filtered voice signal and said filtered error signal to generate a synthetic echo signal; and
   subtracting said synthetic echo signal from said echo signal to cancel said echo signal.

10. The method as described in claim 9, wherein said pre-filtered voice signal is an output from a codebook that is part of a Code Excited Linear Prediction (CELP) based decoder, the input into said codebook an index sent by an encoder.

11. The method as described in claim 9, wherein said Linear Prediction Coding coefficients employ long-term (beta) and short-term (alpha) predictors taken from Code Excited Linear Prediction (CELP) based codecs associated with said first and second transmitters/receivers.

12. The method as described in claim 9, wherein said echo signal is a hybrid circuit output associated with said voice signal.

13. The method as described in claim 9, wherein said voice signal is modeled as an output of an all-pole system exited by a periodic waveform, said output inversely filtered to whiten the voice signal resulting in said step of pre-filtering said voice signal.

14. The method as described in claim 9, wherein said step of applying said FxLMS algorithm is used by an adaptive filter.

15. The method as described in claim 9, wherein said step of filtering said error signal is performed by a digital filter.

16. An echo canceller to reduce an echo signal from a voice signal transmitted over a communication network from a first transmitter/receiver to a second transmitter/receiver comprising:
   a transversal filter coupled to said communication network, wherein said transversal filter filters an error signal using filter coefficients based upon LPC parameters associated with said voice signal to provide filtering variables for a Filtered-X Least Mean Square (FxLMS) adaptive algorithm, said error signal associated with said FxLMS adaptive algorithm and including said echo signal;
   a transversal filter used by said FxLMS adaptive algorithm with a pre-filtered voice signal as an input in order to generate a synthetic echo signal that is subtracted from said echo signal.

17. An echo canceller as described in claim 16, wherein said pre-filtered voice signal is an output from a codebook that is part of a CELP-based decoder, said CELP-based decoder coupled to said communication network.

18. An echo canceller as described in claim 16, wherein said LPC parameters are comprised of Linear Predictive Coding (LPC) coefficients, said LPC coefficients based on long-term (beta) and short-term (alpha) predictors associated with said voice signal taken from CELP based codecs associated with said first and second transmitters/receivers.

19. An echo canceller as described in claim 16, wherein said echo signal is a hybrid output from a hybrid circuit.

20. An echo canceller as described in claim 16, wherein said voice signal is modeled as an output of an all-pole system excited by a periodic waveform, said output inversely filtered to whiten the voice signal resulting said step of pre-filtering said voice signal.

21. A computer-readable medium comprising computer-executable instructions for performing a method of cancelling an echo signal resulting from a voice signal from a first transmitter/receiver, said voice signal transmitted over a communication network to a second transmitter/receiver, said method comprising the steps of:
   obtaining a pre-filtered voice signal with reduced eigenvalue spread from a speech decoder for use as an input to an adaptive filter;
   filtering an error signal with a transversal filter to produce a filtered error signal using filter coefficients associated with said voice signal, said error signal including said echo signal;
   using said adaptive filter with said filtered error signal and said pre-filtered voice signal to generate a synthetic echo signal; and
   subtracting said synthetic echo signal from said echo signal to cancel said echo signal.

22. The computer-readable medium as described in claim 21, wherein a linear prediction coding (LPC) technique generates said pre-filtered voice signal using LPC coefficients associated with said voice signal.

23. The computer-readable medium as described in claim 21, wherein said pre-filtered voice signal is an output from a codebook that is part of a Code Excited Linear Prediction (CELP) based decoder, the input into said codebook being an index sent by an encoder.

24. The computer-readable medium as described in claim 21, wherein said filter coefficients employ Linear Prediction Coding (LPC) coefficients, said LPC coefficients based on the long term (beta) and short term (alpha) predictors associated with said voice signal and taken from CELP-based codecs associated with said first and second transmitter/receivers.

25. The computer-readable medium as described in claim 21, wherein said synthetic echo signal is created using a Filtered-X Least Mean Square (FxLMS) algorithm.

26. The computer-readable medium as described in claim 21, wherein said echo signal is a hybrid circuit output associated with said voice signal.

27. The computer-readable medium as described in claim 21, wherein said filtered error signal is generated by filtering said error signal with the inverse transfer functions of an LPC model obtained from long-term (beta) and short-term (alpha) predictors associated with said voice signal.

28. The computer-readable medium as described in claim 21, wherein said voice signal is modeled as an output of an all-pole system excited by a periodic waveform, said output inversely filtered to whiten said voice signal resulting in said step of pre-filtering said voice signal.

29. An echo canceller for cancelling an echo signal resulting from a voice signal from a first transmitter/receiver, said voice signal transmitted over a communication network to a second transmitter/receiver, comprising:

means for obtaining a pre-filtered voice signal with reduced eigenvalue spread from a speech decoder for use as an input to an adaptive filter;

means for filtering an error signal with a transversal filter to produce a filtered error signal using filter coefficients associated with said voice signal, said error signal including said echo signal;

means for using said adaptive filter with said filtered error signal and said pre-filtered voice signal to generate a synthetic echo signal; and means for subtracting said synthetic echo signal from said echo signal to cancel said echo signal.

30. The echo canceller as described in claim 29, wherein means for using a linear prediction coding (LPC) technique generates said pre-filtered voice signal using LPC coefficients associated with said voice signal.

31. The echo canceller as described in claim 29, wherein said pre-filtered voice signal is an output from a codebook that is part of a Code Excited Linear Prediction (CELP) based decoder, the input into said codebook being an index sent by an encoder.

32. The echo canceller as described in claim 29, wherein said filter coefficients employ Linear Prediction Coding (LPC) coefficients, said LPC coefficients based on the long term (beta) and short term (alpha) predictors associated with said voice signal and taken from CELP-based codecs associated with said first and second transmitter/receivers.

33. The echo canceller as described in claim 29, wherein means for using a Filtered-X Least Mean Square (FxLMS) algorithm creates said synthetic echo signal.

34. The echo canceller as described in claim 29, wherein said echo signal is a hybrid circuit output associated with said voice signal.

35. The echo canceller as described in claim 29, wherein means for filtering said error signal with the inverse transfer functions of an LPC model obtained from long-term (beta) and short-term (alpha) predictors associated with said voice signal generates said filtered error signal.

36. The echo canceller as described in claim 29, wherein said voice signal is modeled as an output of an all-pole system excited by a periodic waveform, said output inversely filtered to whiten said voice signal resulting in said step of pre-filtering said voice signal.

* * * * *